US010380899B2

(12) United States Patent
Kirk

(10) Patent No.: US 10,380,899 B2
(45) Date of Patent: Aug. 13, 2019

(54) GROUND DIRECTION OF AIRCRAFT DATALINKS

(71) Applicant: Honeywell International Inc., Morris Plains, NJ (US)

(72) Inventor: James Christopher Kirk, Clarksville, MD (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/264,549

(22) Filed: Sep. 13, 2016

(65) Prior Publication Data

US 2018/0075756 A1 Mar. 15, 2018

(51) Int. Cl.
*G08G 5/00* (2006.01)
*H04B 7/26* (2006.01)
*H04B 7/185* (2006.01)

(52) U.S. Cl.
CPC ....... *G08G 5/0013* (2013.01); *H04B 7/18506* (2013.01); *H04B 7/18508* (2013.01); *H04B 7/2606* (2013.01)

(58) Field of Classification Search
CPC ............ H04B 7/18506; H04B 7/18508; G08G 5/0013; G08G 5/0026; G08G 5/0078; G08G 5/0082
See application file for complete search history.

(56) References Cited

U.S. PATENT DOCUMENTS

| 6,353,779 B1 | 3/2002 | Simon et al. |
| 8,284,674 B2 | 10/2012 | True et al. |
| 8,676,191 B2 | 3/2014 | Soumier et al. |
| 2005/0209927 A1* | 9/2005 | Aaltonen ........... G06Q 30/0601 705/26.1 |
| 2005/0286452 A1* | 12/2005 | Hardgrave .......... H04W 84/005 370/310 |

(Continued)

OTHER PUBLICATIONS

European Patent Office, "Extended European Search Report from EP Application No. 17189721.2 dated Jan. 25, 2018", from Foreign Counterpart of U.S. Appl. No. 15/264,549, filed Jan. 25, 2018, pp. 1-8, Published in: EP.

*Primary Examiner* — James J Yang
*Assistant Examiner* — Kevin Lau
(74) *Attorney, Agent, or Firm* — Bookoff McAndrews, PLLC

(57) ABSTRACT

A system and method for ground-to-air communications with an aircraft are provided. The system comprises a ground-to-air communications manager that is configured to analyze incoming data from one or more data sources to determine at least a location and flight mode of an aircraft; and assess outgoing data to be sent to the aircraft based on one or more characteristics of the outgoing data, the location and flight mode of the aircraft, and one or more datalink characteristics. The ground-to-air communications manager selects an outgoing datalink and timing of transmit for the outgoing data according to a best result, which is determined from balancing the one or more characteristics of the outgoing data, the location and flight mode of the aircraft, and the one or more datalink characteristics. The ground-to-air communications manager transmits the outgoing data to the aircraft over the selected outgoing datalink at the selected timing of transmit.

20 Claims, 3 Drawing Sheets

(56) References Cited

U.S. PATENT DOCUMENTS

| | | | |
|---|---|---|---|
| 2007/0255850 A1* | 11/2007 | Gould | G08G 5/0026 709/240 |
| 2011/0255506 A1* | 10/2011 | Toth | H04B 7/18506 370/331 |
| 2013/0080043 A1* | 3/2013 | Ballin | G08G 5/0034 701/120 |
| 2017/0069214 A1* | 3/2017 | Dupray | G08G 5/0021 |

* cited by examiner

GROUND DIRECTION OF AIRCRAFT DATALINKS

BACKGROUND

Aircraft are moving into an era of multi-link connectivity from the air to the ground, in which aircraft not only transmit great amounts of data from the air to the ground, but in which ground stations have large amounts of data, such as software, maps, entertainment, and other updates to send to the aircraft. Thus, the need to optimize datalink systems not only for downlink but also for uplink is emerging.

Currently, aircraft systems are being developed to examine data to be sent to the ground and to pick the right link based on economy, timeliness, priority, urgency, and latency. However, most automated communications management systems are platform based, and examine the data only from an aircraft centric and aircraft information driven decision process.

SUMMARY

A system and method for ground-to-air communications with an aircraft are provided. The system comprises a ground-to-air communications manager that is configured to analyze incoming data from one or more data sources to determine at least a location and flight mode of an aircraft; and assess outgoing data to be sent to the aircraft based on one or more characteristics of the outgoing data, the location and flight mode of the aircraft, and one or more datalink characteristics. The ground-to-air communications manager is configured to select an outgoing datalink and timing of transmit for the outgoing data according to a best result, which is determined from balancing the one or more characteristics of the outgoing data, the location and flight mode of the aircraft, and the one or more datalink characteristics. The ground-to-air communications manager is configured to transmit the outgoing data to the aircraft over the selected outgoing datalink at the selected timing of transmit.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
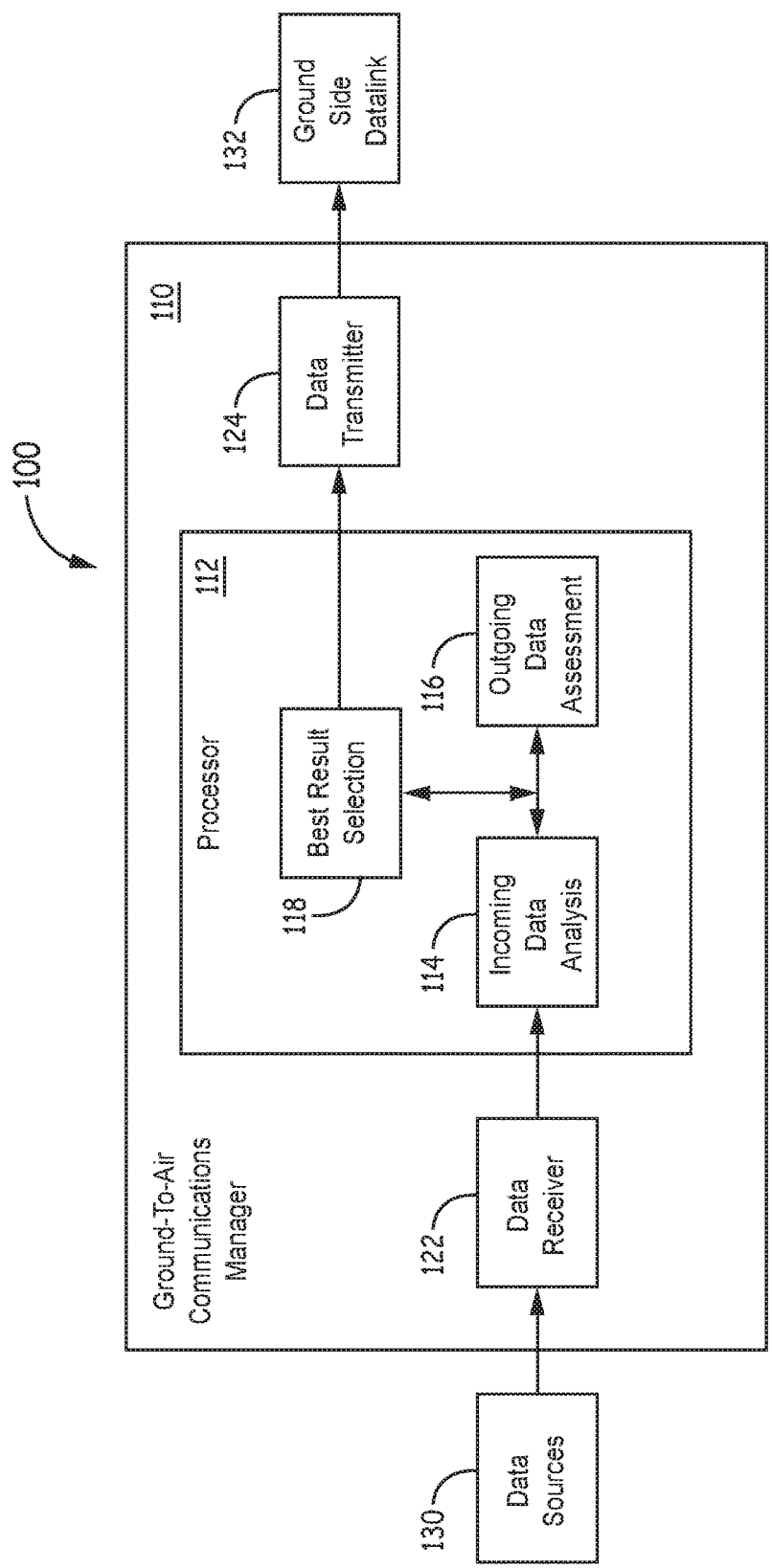
FIG. 1 is a block diagram of a system for ground-to-air communications according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method are provided for ground-to-air communications with an aircraft, in which data is sent to an aircraft from the ground. The present approach dynamically assesses which datalink is best suited for movement of any given information sent from the ground to the aircraft. This provides for ground prediction of best conditions for management of aircraft datalinks, and ground management of the links with the cooperation of the aircraft.

In one embodiment, a ground-to-air (GTA) communications manager is provided, which can be located at a ground data support center. The GTA communications manager examines incoming data from various data sources, such as aircraft phase of flight, aircraft source and destination, aircraft position in the flightpath, known delays at the destination, and the like.

The GTA communications manager also performs an assessment of various characteristics of the outgoing data to be sent to an aircraft, such as urgency of the data, as in how soon the data is needed; size of the data, as in how much data is to be sent; transmission time of the data, as in how long the data would take to send for any given link; shelf life, as in how long the information would be useful; criticality of the data, as in how critical is it to send the data to the aircraft; freshness of the data, meaning is the data the latest and best data, or is there another set of data expected before the expiry of the last set of data; and priority of the data, as in where does the data stand in a queue of data waiting to get onto or off of the aircraft in terms of importance.

The available datalink characteristics are also assessed based on a set of parameters and business rules, such as cost to transmit over a given link; time to transmit over a given link; datalinks available on the aircraft; datalinks available at the destination; datalinks available at any given phase of flight (e.g., SATCOM L-Ka-Ku, Irridium, cell modem, Wi-Fi, air-to-ground LTE in flight, ACARS, and the like); and properties of all datalinks, including but not limited to status and reliability.

The GTA communications manager then selects an outgoing datalink and timing of transmit for the outgoing data using a best result selection algorithm, which balances the characteristics of the outgoing data, knowledge of the aircraft location and flight mode, and the various datalink criteria. This allows for determining which datalink at which phase of flight best serves the needs of the aircraft and the data to be moved.

In addition, the GTA communications manager can also be configured to contact the aircraft to schedule any link needed at any given time during the flight as it is needed, over any available link that is operational, or that can be "called" when not operational, to schedule links that must be scheduled if they cannot be called.

Further details of the present system and method are described hereafter with reference to the drawings.

FIG. 1 illustrates a system 100 for ground-to-air communications, according to one embodiment. The system 100 includes a ground-to-air (GTA) communications manager 110 with at least one processer 112 operative to provide various data processing functions. The GTA communications manager 110 is configured to process and send various GTA uplink messages to aircraft as needed, using an outgoing datalink and timing of transmit for outgoing data that are selected according to a best result algorithm, as described further hereafter.

Various processor executable modules or applications reside within processor 112 in one or more memory units. These include, for example, an incoming data analysis module 114 and an outgoing data assessment module 116, which are in operative communication with each other. The processor 112 also includes a best result selection module 118 in operative communication with incoming data analysis module 114 and outgoing data assessment module 116. The GTA communications manager 110 also includes at least one data receiver 122 and at least one data transmitter 124, which are in operative communication with processor 112.

The data receiver 122 is configured to receive various types of incoming data from one or more data sources 130, such as aircraft location and logistics data, map update data, weather update data, air traffic control (ATC) updates, and the like. The incoming data analysis module 114 processes and analyzes the incoming data from data sources 130 to determine, for example, a location and flight mode (e.g., at gate, taxi, in air, etc.) of an aircraft that is to receive data from GTA communications manager 110.

The outgoing data assessment module 116 uses the incoming data, along with characteristics of outgoing data (e.g., size, urgency, priority, etc.) and various link criteria for available datalinks, to assess the outgoing data to be sent to the aircraft. The outgoing datalink and timing of transmit for the outgoing data are selected by best result selection module 118 which balances the characteristics of the outgoing data, knowledge of the aircraft location and flight mode, and the various datalink criteria. The outgoing data is sent from processor 112 to data transmitter 124, which is configured to send the outgoing data to a selected ground side datalink 132 at the selected time, for transmission to the aircraft.

Figure 2:
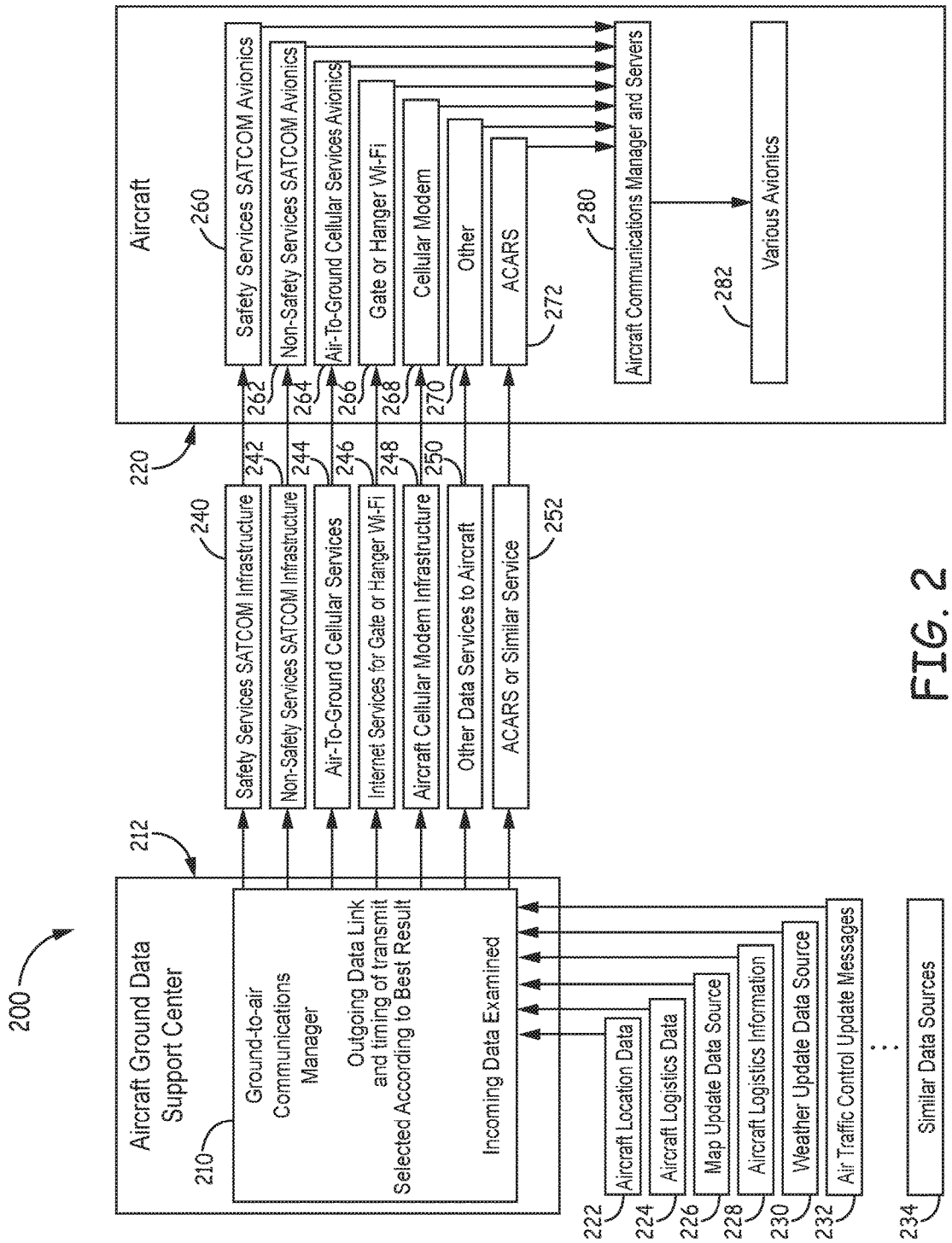
FIG. 2 is a block diagram of a system for ground-to-air communications with an aircraft, according to an exemplary implementation.

FIG. 2 illustrates a system 200 for ground-to-air communications with an aircraft, according to an exemplary implementation. The system 200 comprises a GTA communications manager 210, which provides various data processing functions, as well as selection of an outgoing datalink and timing of transmit of the data. The datalink and timing of transmit are selected according to a best result, such as described above with respect to system 100. The GTA communications manager 210 can be located in an aircraft ground data support center 212, for example. The GTA communications manager 210 is configured to provide GTA communications with an aircraft 220, for example.

The GTA communications manager 210 is configured to receive incoming data to be examined and analyzed, which can include aircraft location data 222, aircraft logistics data 224, data from a map update data source 226, aircraft logistics information 228, data from a weather update data source 230, air traffic control (ATC) update messages 232, and various other similar data sources 234. Other incoming data can include aircraft phase of flight, aircraft source and destination, aircraft position in a flightpath, or known delays at a destination.

The GTA communications manager 210 is operative to assess outgoing data to be sent to an aircraft, such as aircraft 220, based on one or more characteristics or criteria, such as urgency of the data, size of the data, transmission time of the data, useful life of the data, criticality of the data, freshness of the data, priority of the data, and the like. The GTA communications manager 210 is also operative to assess various link criteria or characteristics for available datalinks, such as cost to transmit the data over a given datalink, time to transmit the data over a given datalink, datalinks available on the aircraft, datalinks available at the destination, datalinks available at any given aircraft phase of flight, properties of all available datalinks, or the like. The outgoing datalink and timing of transmit for the outgoing data is then selected according to a best result, which is determined from balancing the characteristics of the outgoing data, the aircraft location and flight mode of aircraft 220, and the characteristics of available datalinks.

The outgoing data is transmitted to aircraft 220 over the selected outgoing datalink at the selected timing of transmit. As shown in FIG. 2, various communication services can be used to transmit the data to aircraft 220 over a selected datalink. Exemplary communication services include safety services satellite communications (SATCOM) infrastructure 240, non-safety services SATCOM infrastructure 242, air-to-ground cellular services 244, Internet services for gate or hanger Wi-Fi 246, aircraft cellular modem infrastructure 248, other data services to aircraft 250, ACARS or similar service 252, and the like.

The aircraft 220 can include corresponding onboard equipment configured to receive the data from the various communication services. Such onboard equipment can include safety services SATCOM avionics 260, non-safety services SATCOM avionics 262, air-to-ground cellular services avionics 264, gate or hanger Wi-Fi 266, a cellular modem 268, other data services equipment 270, and ACARS or similar service equipment 272. This onboard equipment is in operative communication with an onboard aircraft communications manager and servers 280, which in turn operatively communicate with various onboard avionics systems 282.

Figure 3:
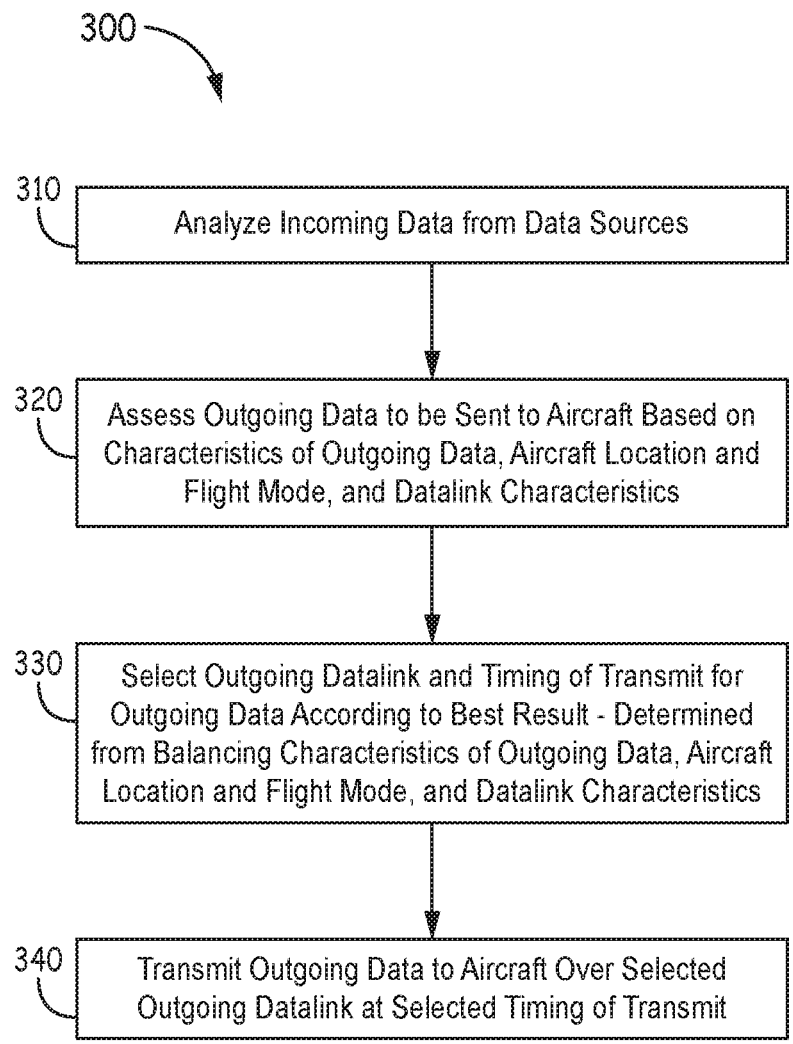
FIG. 3 is a flow diagram of a method for ground-to-air communications with an aircraft, according to one implementation.

FIG. 3 is a flow diagram of a method 300 for GTA communications with an aircraft, such as aircraft 220 during operation of GTA communications manager 210. Incoming data is analyzed from one or more of the data sources (block 310), such as to determine an aircraft location and flight mode. In addition, outgoing data to be sent to the aircraft is assessed based on one or more characteristics of the outgoing data, the aircraft location and flight mode, and one or more datalink characteristics (block 320). An outgoing datalink and timing of transmit for the outgoing data is then selected according to a best result, which is determined from balancing characteristics of the outgoing data, the aircraft location and flight mode, and the datalink characteristics (block 330). The outgoing data is then transmitted to the aircraft over the selected outgoing datalink at the selected timing of transmit (block 340).

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present method can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a system for ground-to-air communications, the system comprising a ground-to-air communications manager that includes at least one processor operative to execute processor readable instructions that comprise: analyze incoming data from one or more data sources to determine at least a location and flight mode of an aircraft; assess outgoing data to be sent to the aircraft based on one or more characteristics of the outgoing data, the location and flight mode of the aircraft, and one or more datalink characteristics; select an outgoing datalink and timing of transmit for the outgoing data according to a best result, which is determined from balancing the one or more characteristics of the outgoing data, the location and flight mode of the aircraft, and the one or more datalink characteristics; and transmit the outgoing data to the aircraft over the selected outgoing datalink at the selected timing of transmit.

Example 2 includes the system of Example 1, wherein the incoming data from the one or more data sources comprises aircraft location data, aircraft logistics data, data from a map update data source, aircraft logistics information, data from a weather update data source, or air traffic control update messages.

Example 3 includes the system of Example 2, wherein the incoming data from the one or more data sources further comprises aircraft phase of flight, aircraft source and destination, aircraft position in a flightpath, or known delays at a destination.

Example 4 includes the system of any of Examples 1-3, wherein the one or more characteristics of the outgoing data comprises urgency of the outgoing data, size of the outgoing data, transmission time of the outgoing data, useful life of the outgoing data, criticality of the outgoing data, freshness of the outgoing data, or priority of the outgoing data.

Example 5 includes the system of any of Examples 1-4, wherein the one or more datalink characteristics comprises cost to transmit the outgoing data over a given datalink, transmit time of the outgoing data over a given datalink, datalinks available on the aircraft, datalinks available at a destination, datalinks available at any given aircraft phase of flight, or properties of all available datalinks.

Example 6 includes the system of any of Examples 1-5, wherein the ground-to-air communications manager is located in an aircraft ground data support center.

Example 7 includes the system of any of Examples 1-6, wherein the selected outgoing datalink operatively communicates with one or more aircraft communications services comprising a safety services satellite communications (SATCOM) infrastructure, a non-safety services SATCOM infrastructure, air-to-ground cellular services, Internet services for a gate or hanger Wi-Fi, an aircraft cellular modem infrastructure, or an ACARS service.

Example 8 includes a method for ground-to-air communications with an aircraft, the method comprising: receiving incoming data from one or more data sources at a ground-to-air communications manager that includes at least one processor; analyzing the incoming data, by the at least one processor, to determine at least a location and flight mode of the aircraft; assessing, by the at least one processor, outgoing data to be sent to the aircraft from the ground-to-air communications manager, the assessing of the outgoing data based on one or more characteristics of the outgoing data, the location and flight mode of the aircraft, and one or more datalink characteristics; selecting an outgoing datalink and timing of transmit for the outgoing data according to a best result, which is determined by the at least one processor, from balancing the one or more characteristics of the outgoing data, the location and flight mode of the aircraft, and the one or more datalink characteristics; and transmitting the outgoing data, from the ground-to-air communications manager to the aircraft, over the selected outgoing datalink at the selected timing of transmit.

Example 9 includes the method of Example 8, wherein the incoming data from the one or more data sources comprises aircraft location data, aircraft logistics data, data from a map update data source, aircraft logistics information, data from a weather update data source, or air traffic control update messages.

Example 10 includes the method of Example 9, wherein the incoming data from the one or more data sources further comprises aircraft phase of flight, aircraft source and destination, aircraft position in a flightpath, or known delays at a destination.

Example 11 includes the method of any of Examples 8-10, wherein the one or more characteristics of the outgoing data comprises urgency of the outgoing data, size of the outgoing data, transmission time of the outgoing data, useful life of the outgoing data, criticality of the outgoing data, freshness of the outgoing data, or priority of the outgoing data.

Example 12 includes the method of any of Examples 8-11, wherein the one or more datalink characteristics comprises cost to transmit the outgoing data over a given datalink, transmit time of the outgoing data over a given datalink, datalinks available on the aircraft, datalinks available at a destination, datalinks available at any given aircraft phase of flight, or properties of all available datalinks.

Example 13 includes the method of any of Examples 8-12, wherein the selected outgoing datalink operatively communicates with one or more aircraft communications services comprising a safety services satellite communications (SATCOM) infrastructure, a non-safety services SATCOM infrastructure, air-to-ground cellular services, Internet services for a gate or hanger Wi-Fi, an aircraft cellular modem infrastructure, or an ACARS service.

Example 14 includes the method of Example 13, wherein the aircraft includes corresponding onboard equipment configured to receive data from the one or more aircraft communications services.

Example 15 includes the method of Example 14, wherein the onboard equipment comprises safety services SATCOM avionics, non-safety services SATCOM avionics, air-to-ground cellular services avionics, a gate or hanger Wi-Fi, a cellular modem, or ACARS equipment.

Example 16 includes the method of any of Examples 14-15, wherein the onboard equipment is in operative communication with an onboard aircraft communications manager and servers, which in turn operatively communicate with one or more onboard avionics systems.

Example 17 includes a computer program product, comprising: a non-transitory computer readable medium having instructions stored thereon executable by a processor to perform a method comprising: analyzing incoming data from one or more data sources to determine at least a location and flight mode of an aircraft; assessing outgoing data to be sent to the aircraft based on one or more characteristics of the outgoing data, the location and flight mode of the aircraft, and one or more datalink characteristics; selecting an outgoing datalink and timing of transmit for the outgoing data according to a best result, which is determined from balancing the one or more characteristics of the outgoing data, the location and flight mode of the aircraft, and the one or more datalink characteristics; and transmitting the outgoing data to the aircraft over the selected outgoing datalink at the selected timing of transmit.

Example 18 includes the computer program product of Example 17, wherein the incoming data from the one or more data sources comprises aircraft location data, aircraft logistics data, data from a map update data source, aircraft logistics information, data from a weather update data source, or air traffic control update messages.

Example 19 includes the computer program product of any of Examples 17-18, wherein the one or more characteristics of the outgoing data comprises urgency of the outgoing data, size of the outgoing data, transmission time of the outgoing data, useful life of the outgoing data, criticality of the outgoing data, freshness of the outgoing data, or priority of the outgoing data.

Example 20 includes the computer program product of any of Examples 17-19, wherein the one or more datalink characteristics comprises cost to transmit the outgoing data over a given datalink, transmit time of the outgoing data over a given datalink, datalinks available on the aircraft, datalinks available at a destination, datalinks available at any given aircraft phase of flight, or properties of all available datalinks.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for ground-to-air communications, the system comprising:
   a ground-to-air communications manager that includes at least one processer operative to execute processor readable instructions that comprise steps to:
      analyze, at the ground-to-air communications manager, incoming data from one or more data sources to determine at least a location and flight mode of an aircraft, wherein the incoming data from the one or more data sources comprises aircraft logistics data, data from a map update data source, aircraft logistics information, data from a weather update data source, or air traffic control update messages;
      assess, at the ground-to-air communications manager, outgoing data to be sent to the aircraft based on one or more characteristics of the outgoing data, the location and flight mode of the aircraft, and one or more datalink characteristics;
      select an outgoing datalink of the ground-to-air communications manager and timing of transmit for the outgoing data according to a best result algorithm, wherein the best result algorithm:
         balances the one or more characteristics of the outgoing data, the location and flight mode of the aircraft, and the one or more datalink characteristics, and
         determines the outgoing datalink for the flight mode that serves the aircraft and the outgoing data;
      transmit a schedule request to the aircraft, over an operative datalink of the aircraft, to schedule the outgoing datalink to be operative on the aircraft at the selected timing of transmit; and
      transmit the outgoing data to the aircraft over the selected outgoing datalink at the selected timing of transmit.

2. The system of claim 1, wherein the incoming data from the one or more data sources further comprises aircraft location data.

3. The system of claim 2, wherein the incoming data from the one or more data sources further comprises aircraft phase of flight, aircraft source and destination, aircraft position in a flightpath, or known delays at a destination.

4. The system of claim 1, wherein the one or more characteristics of the outgoing data comprises urgency of the outgoing data, size of the outgoing data, transmission time of the outgoing data, useful life of the outgoing data, criticality of the outgoing data, freshness of the outgoing data, or priority of the outgoing data.

5. The system of claim 1, wherein the one or more datalink characteristics comprises cost to transmit the outgoing data over a given datalink, transmit time of the outgoing data over a given datalink, datalinks available on the aircraft, datalinks available at a destination, datalinks available at any given aircraft phase of flight, or properties of all available datalinks.

6. The system of claim 1, wherein the ground-to-air communications manager is located in an aircraft ground data support center.

7. The system of claim 1, wherein the selected outgoing datalink operatively communicates with one or more aircraft communications services comprising a safety services satellite communications (SATCOM) infrastructure, a non-safety services SATCOM infrastructure, air-to-ground cellular services, Internet services for a gate or hanger Wi-Fi, an aircraft cellular modem infrastructure, or an ACARS service.

8. A method for ground-to-air communications with an aircraft, the method comprising:
   receiving incoming data from one or more data sources at a ground-to-air communications manager that includes at least one processor;
   analyzing the incoming data, by the at least one processor, to determine at least a location and flight mode of the aircraft;
   assessing, by the at least one processor, outgoing data to be sent to the aircraft from the ground-to-air communications manager, the assessing of the outgoing data based on one or more characteristics of the outgoing data, the location and flight mode of the aircraft, and one or more datalink characteristics, wherein the one or more characteristics of the outgoing data comprises urgency of the outgoing data, transmission time of the outgoing data, useful life of the outgoing data, criticality of the outgoing data, freshness of the outgoing data, or priority of the outgoing data;

selecting an outgoing datalink of the ground-to-air communications manager and timing of transmit for the outgoing data according to a best result algorithm, wherein the best result algorithm:
    balances the one or more characteristics of the outgoing data, the location and flight mode of the aircraft, and the one or more datalink characteristics, and
    determines the outgoing datalink for the flight mode that serves the aircraft and the outgoing data;
transmitting a schedule request to the aircraft, over an operative datalink of the aircraft, to schedule the outgoing datalink to be operative on the aircraft at the selected timing of transmit; and
transmitting the outgoing data, from the ground-to-air communications manager to the aircraft, over the selected outgoing datalink at the selected timing of transmit.

9. The method of claim 8, wherein the incoming data from the one or more data sources comprises aircraft location data, aircraft logistics data, data from a map update data source, aircraft logistics information, data from a weather update data source, or air traffic control update messages.

10. The method of claim 9, wherein the incoming data from the one or more data sources further comprises aircraft phase of flight, aircraft source and destination, aircraft position in a flightpath, or known delays at a destination.

11. The method of claim 8, wherein the one or more characteristics of the outgoing data further comprises size of the outgoing data.

12. The method of claim 8, wherein the one or more datalink characteristics comprises cost to transmit the outgoing data over a given datalink, transmit time of the outgoing data over a given datalink, datalinks available on the aircraft, datalinks available at a destination, datalinks available at any given aircraft phase of flight, or properties of all available datalinks.

13. The method of claim 8, wherein the selected outgoing datalink operatively communicates with one or more aircraft communications services comprising a safety services satellite communications (SATCOM) infrastructure, a non-safety services SATCOM infrastructure, air-to-ground cellular services, Internet services for a gate or hanger Wi-Fi, an aircraft cellular modem infrastructure, or an ACARS service.

14. The method of claim 13, wherein the aircraft includes corresponding onboard equipment configured to receive data from the one or more aircraft communications services.

15. The method of claim 14, wherein the onboard equipment comprises safety services SATCOM avionics, non-safety services SATCOM avionics, air-to-ground cellular services avionics, a gate or hanger Wi-Fi, a cellular modem, or ACARS equipment.

16. The method of claim 14, wherein the onboard equipment is in operative communication with an onboard aircraft communications manager and servers, which in turn operatively communicate with one or more onboard avionics systems.

17. A computer program product, comprising:
    a non-transitory computer readable medium having instructions stored thereon executable by a processor to perform a method comprising:
        analyzing incoming data from one or more data sources to determine at least a location and flight mode of an aircraft, wherein the incoming data from the one or more data sources comprises aircraft logistics data, data from a map update data source, aircraft logistics information, data from a weather update data source, or air traffic control update messages;
        assessing outgoing data to be sent to the aircraft based on one or more characteristics of the outgoing data, the location and flight mode of the aircraft, and one or more datalink characteristics;
        selecting an outgoing datalink and timing of transmit for the outgoing data according to a best result algorithm, wherein the best result algorithm:
            balances the one or more characteristics of the outgoing data, the location and flight mode of the aircraft, and the one or more datalink characteristics, and
            determines the outgoing datalink for the flight mode that serves the aircraft and the outgoing data;
        transmitting a schedule request to the aircraft, over an operative datalink of the aircraft, to schedule the outgoing datalink to be operative on the aircraft at the selected timing of transmit; and
        transmitting the outgoing data to the aircraft over the selected outgoing datalink at the selected timing of transmit.

18. The computer program product of claim 17, wherein the incoming data from the one or more data sources further comprises aircraft location data.

19. The computer program product of claim 18, wherein the one or more characteristics of the outgoing data comprises urgency of the outgoing data, size of the outgoing data, transmission time of the outgoing data, useful life of the outgoing data, criticality of the outgoing data, freshness of the outgoing data, or priority of the outgoing data.

20. The computer program product of claim 19, wherein the one or more datalink characteristics comprises cost to transmit the outgoing data over a given datalink, transmit time of the outgoing data over a given datalink, datalinks available on the aircraft, datalinks available at a destination, datalinks available at any given aircraft phase of flight, or properties of all available datalinks.

\* \* \* \* \*